US012128799B2

(12) United States Patent
Kim et al.

(10) Patent No.: US 12,128,799 B2
(45) Date of Patent: Oct. 29, 2024

(54) RELAX MODE IMPLEMENTABLE VEHICLE SEAT

(71) Applicants: Hyundai Motor Company, Seoul (KR); Kia Corporation, Seoul (KR)

(72) Inventors: Mu Young Kim, Osan-si (KR); Sang Do Park, Suwon-si (KR); Ho Suk Jung, Hwaseong-si (KR); Jun Young Yun, Osan-si (KR); Jun Hwan Lee, Seoul (KR); Chan Ho Jung, Gunpo-si (KR); Hyeok Seung Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/099,426

(22) Filed: Jan. 20, 2023

(65) Prior Publication Data
US 2024/0092237 A1 Mar. 21, 2024

(30) Foreign Application Priority Data
Sep. 16, 2022 (KR) ................. 10-2022-0117113

(51) Int. Cl.
*B60N 2/30* (2006.01)
*B60N 2/838* (2018.01)
(52) U.S. Cl.
CPC ......... *B60N 2/3065* (2013.01); *B60N 2/3004* (2013.01); *B60N 2/838* (2018.02)

(58) Field of Classification Search
CPC ...... B60N 2/206; B60N 2/3004; B60N 2/838; B60N 2/36; B60N 2/2213; B60N 2/3031; B60N 2/3065
USPC ........................................ 297/329, 317, 324
See application file for complete search history.

(56) References Cited

U.S. PATENT DOCUMENTS

| 6,899,392 | B1 * | 5/2005 | Saberan | B60N 2/3022 |
| | | | | 297/334 |
| 7,066,543 | B2 * | 6/2006 | Yu | B60N 2/3013 |
| | | | | 297/378.12 |
| 2010/0084903 | A1 * | 4/2010 | Kammerer | B60N 2/01583 |
| | | | | 297/331 |

FOREIGN PATENT DOCUMENTS

| EP | 2 587 965 B1 | 7/2015 |
| JP | 6871046 B2 | 5/2021 |
| KR | 20120045449 A * | 5/2012 |
| KR | 10-1337935 B1 | 12/2013 |

* cited by examiner

*Primary Examiner* — Milton Nelson, Jr.
(74) *Attorney, Agent, or Firm* — Morgan, Lewis & Bockius LLP

(57) ABSTRACT

The present disclosure relates to a vehicle seat wherein matchability with a luggage box is maintained when the seat is folded, and a relax mode and a backward relax mode can be implemented. The vehicle seat according to the present disclosure includes: a tilting link configured to tilt a front portion of a seat cushion upwards/downwards; and a sliding bracket having one end to which a seat is connected by a hinge structure such that the seat is tilted around the hinge structure, the other end of the sliding bracket being connected so as to slide forwards/backwards.

11 Claims, 8 Drawing Sheets

RELAX MODE IMPLEMENTABLE VEHICLE SEAT

CROSS-REFERENCE TO RELATED APPLICATION(S)

This application is based on and claims priority under 35 U.S.C. 119 to Korean Patent Application No. 10-2022-0117113, filed on Sep. 16, 2022, in the Korean Intellectual Property Office, the disclosure of which is herein incorporated by reference in its entirety.

BACKGROUND

1. Technical Field

The present disclosure relates to a vehicle seat wherein matchability with a luggage box is maintained when the seat is folded, and a relax mode and a backward relax mode can be implemented.

2. Description of Related Art

Two-row seats of SUVs are capable of tilting while maintaining fold-and-dive functions, thereby implementing a relax mode.

In addition, three-row seats can match with luggage boxes behind the seats with no level difference during folding, thereby providing wide loading spaces.

However, three-row seats interfere with luggage boxes in a relax mode, thereby limiting the amount of reclining movement of the seats. This poses a problem in that it is difficult to apply the relax mode to three-row seats.

The above descriptions regarding background technologies have been made only to help understanding of the background of the present disclosure, and are not to be deemed by those skilled in the art to correspond to already-known related art.

SUMMARY

The present disclosure has been made in order to solve the above-mentioned problems, and it is an aspect of the present disclosure to provide a vehicle seat wherein matchability with a luggage box is maintained when the seat is folded, and a relax mode and can be implemented.

It is another aspect of the present disclosure to provide a vehicle seat wherein a backward relax mode of the seat is implemented.

In accordance with an aspect of the present disclosure, a vehicle seat may include: a seat cushion; a tilting link configured to tilt a front portion of a seat cushion upwards or downwards; and a sliding bracket having one end to which a seat is connected by a first hinge structure such that the seat is tilted around the hinge structure, the other end of the sliding bracket being connected so as to slide forwards or backwards.

The vehicle seat may further include a seat back. The tilting link may include both ends connected to the seat cushion and to a vehicle body, respectively, by second and third hinge structures, respectively, one end of the sliding bracket may be connected to the seat back or to the seat cushion, and the other end of the sliding bracket may be coupled to a movable rail configured to slide along a fixed rail.

The vehicle seat may further include a seat back. The tilting link may include: a front end connected to a bottom surface of the seat cushion in front of the seat, and a rear end connected to a middle part of the seat cushion, and the sliding bracket may include: an upper end connected to a lower end of the seat back, and a lower end configured to slide forwards or backwards behind the tilting link.

The vehicle seat may further include a driving unit configured to provide driving torque to the tilting link.

The driving unit may have a rotating shaft connected to the tilting link by a power transfer element.

The driving unit may have: a pinion gear and a rotating shaft to which the pinion gear is coupled, and the vehicle seat may further include a sector gear disposed on an edge of the other end of the tilting link around a third hinge structure, and the sector gear may be coupled to the pinion gear so as to mesh with the pinion gear.

A lead screw may be connected to a rotating shaft of the driving unit such that rotational movements of the driving unit are converted into linear movements of the lead screw, a tilt operating bar may be coupled to a remaining part of the tilting link other than one end and the other end thereof, and the lead screw may be coupled to the tilt operating bar.

The tilting link coupled to the seat cushion may be configured to, during a folding mode of the seat in a structure in which a luggage box is disposed behind the seat, rotate downwards such that the front end of the seat cushion is tilted downwards, the sliding bracket is configured to slide forwards, thereby increasing an interval between the seat back and the luggage box, and the seat back may be configured to fold without interfering with the luggage due to the increased interval in the folding mode.

The tilting link coupled to the seat cushion may be configured to, during a relax mode of the seat in a structure in which a luggage box is disposed behind the seat, rotate upwards such that the front end of the seat cushion is tilted upwards, the sliding bracket may be configured to slide forwards, thereby increasing an interval between the seat back and the luggage box, and the seat back may be configured to recline backwards as much as the increased interval.

The tilting link coupled to the seat cushion may be configured to, during a backward relax mode of the seat, rotate upwards such that the front end of the seat cushion is tilted upwards, the sliding bracket may be configured to slide forwards to a maximum extent, thereby inverting postures of the seat back and the seat cushion, and the seat may be configured to assume a backward-facing posture.

A head rest coupled to the seat back may be configured to fold toward the rear portion of the seat back during the backward relax mode of the seat, and a leg rest coupled to the seat cushion may be configured to unfold in parallel to the seat cushion.

The present disclosure, as described above, is advantageous in that the interval between the seat and the luggage box is increased by a downward movement of the front end of the seat cushion in a folding mode such that the seat back and the luggage box are horizontally matched (or aligned) while avoiding interference between the seat back and the luggage box, thereby implementing a seat folding mode stably.

In a relax mode, the interval between the seat and the luggage box is increased by an upward movement of the front end of the seat cushion such that the amount of reclining movement of the seat back is increased, thereby implementing a seat relax mode stably.

In a backward relax mode, the posture of the seat cushion and that of the seat back are inverted by an excessive upward movement of the front end of the seat cushion, thereby implementing a backward relax mode in which the passenger on the seat faces backwards.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
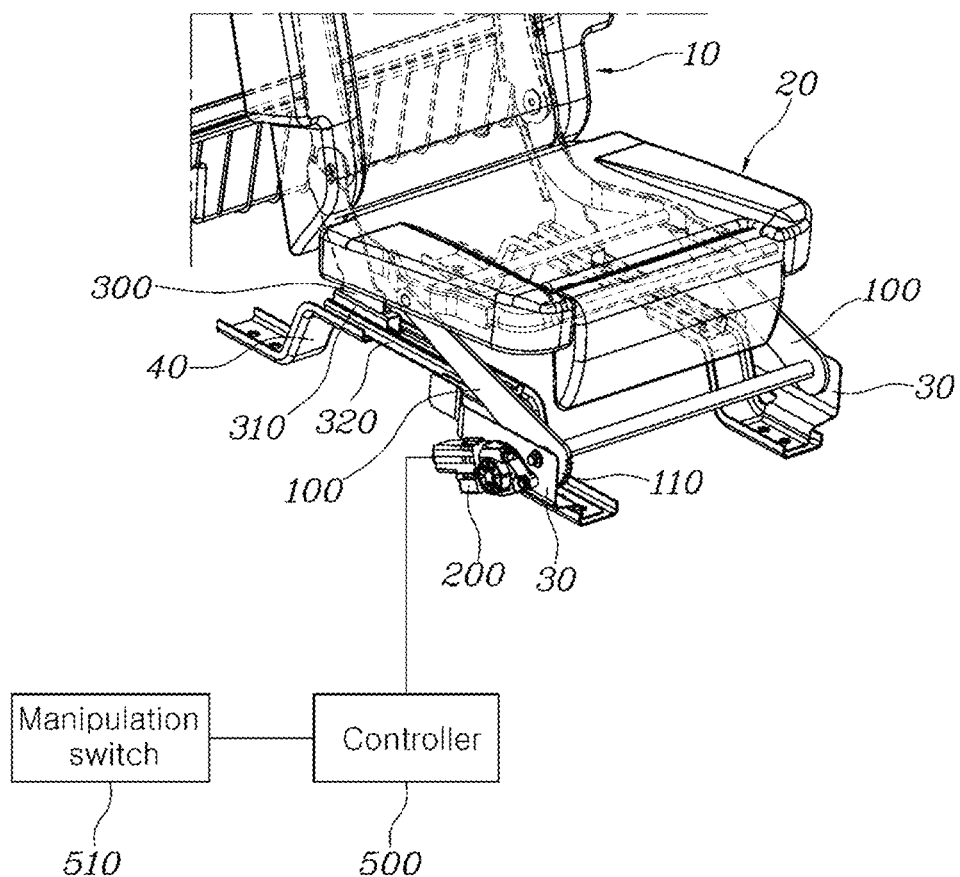
FIG. 1 illustrates a seat according to the present disclosure.

Hereinafter, embodiments disclosed in the present specification will be described in detail with reference to the accompanying drawings, and the same or similar elements are given the same and similar reference numerals, so duplicate descriptions thereof will be omitted.

The terms "module" and "unit" used for the elements in the following description are given or interchangeably used in consideration of the ease of writing the specification, and may not have distinct meanings or roles by themselves.

In describing the embodiments disclosed in the present specification, when the detailed description of the relevant known technology is determined to unnecessarily obscure the gist of the present disclosure, the detailed description may be omitted. Further, the accompanying drawings are provided for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in the context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

A unit or a control unit included in names such as a motor control unit (MCU) and a hybrid control unit (HCU) is merely a term widely used for naming a controller configured to control a specific function of a vehicle, but does not mean a generic function unit.

A controller may include a communication device that communicates with other controllers or sensors in order to control functions in charge, a memory that stores an operating system or logic instructions, input/output information, and the like, and one or more processors that perform determinations, computations, decisions, and the like.

Figure 2:
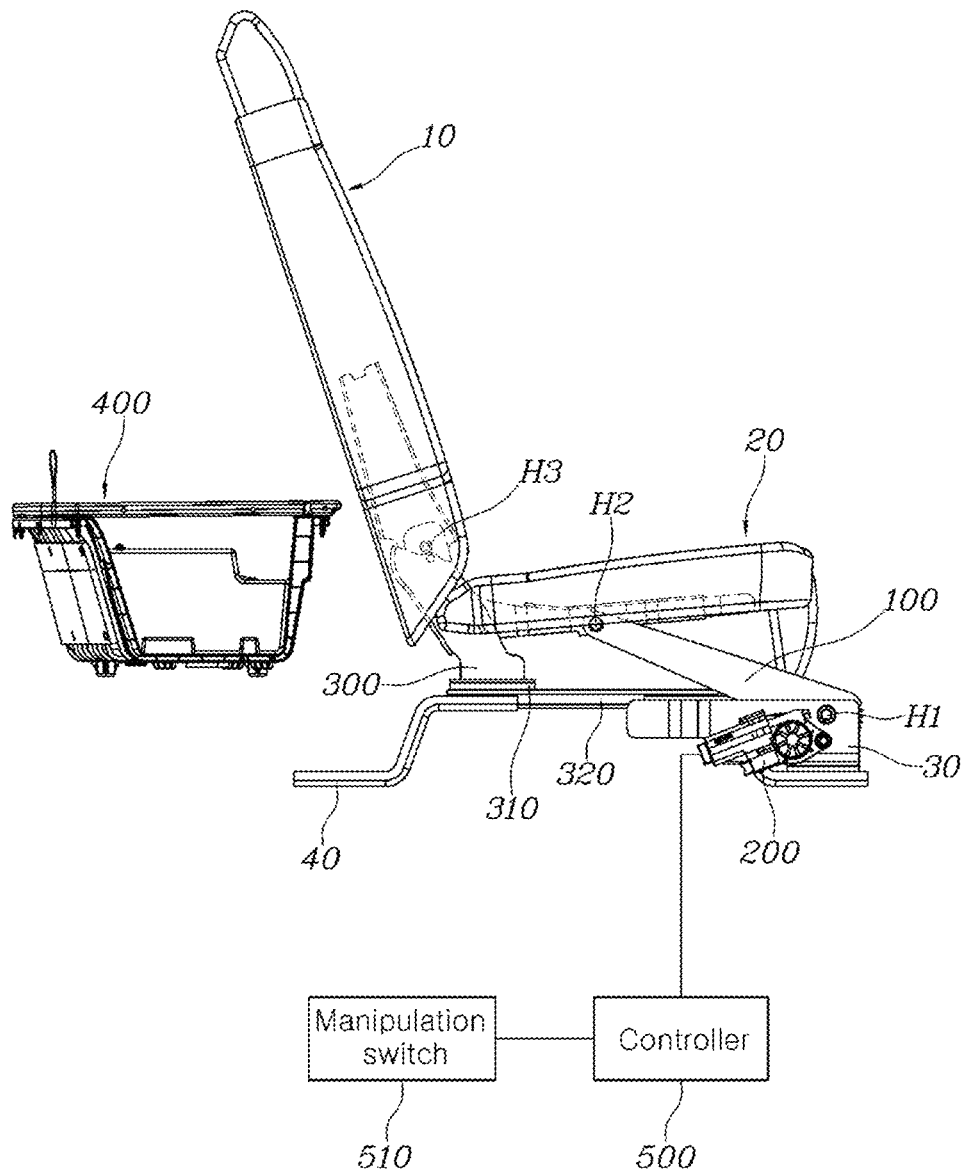
FIG. 2 illustrates the relation of coupling between a seat, a tilting link, and a sliding bracket according to the present disclosure.

FIG. 1 illustrates a seat according to the present disclosure, and FIG. 2 illustrates the relation of coupling between a seat, a tilting link 100, and a sliding bracket 300 according to the present disclosure.

Referring to the drawings, the present disclosure includes a tilting link 100 configured to tilt the front end of a seat cushion 20 upwards/downwards, and a sliding bracket 300 having one end to which a seat is connected by a hinge structure such that the seat is tilted around the hinge structure, the other end of the sliding bracket 300 being connected so as to slide forwards/backwards.

For example, the present disclosure is appropriately applied to a seat positioned in front of a luggage box 400 of an SUV such that, during a folding mode operation of the seat, the seat back 10 is folded while avoiding interference between the seat and the luggage box 400.

In addition, during a relax mode operation of the seat, the amount of backward movement of the seat back 10 toward the luggage box 400 is increased, thereby reclining the seat back 10.

That is, in the case of a folding mode, the front end of the seat cushion 20 is moved downwards by rotation of the tilting link 100 in one direction, and the seat moves forwards in a predetermined range together with the sliding bracket 300 as a result of the downward movement of the front end of the seat cushion 20, thereby increasing the interval between the seat and the luggage box 400.

If the seat back 10 is then folded, no interference occurs between the seat back 10 and the luggage box 400 when the same is folded, and the folded seat back 10 and the luggage box 400 are horizontally matched (aligned), thereby stably implementing a seat folding mode.

Furthermore, in the case of a relax mode, the front end of the seat cushion 20 is moved upwards by rotation of the tilting link 100 in the other direction, and the seat moves forwards together with the sliding bracket 300 as a result of the upward movement of the front end of the seat cushion 20, thereby increasing the interval between the seat and the luggage box 400.

As such, when the seat back 10 is reclined, the amount of reclining movement of the seat back 10 is increased, thereby implementing a stable seat relax mode.

Referring to FIG. 2, both ends of the tilting link 100 according to the present disclosure are rotatably coupled, and only the upper end of the sliding bracket 300 is rotatably coupled to the seat.

Referring to FIG. 2, both ends of the tilting link 100 may be connected to the seat cushion 20 and to the vehicle body by hinge structures, respectively. One end of the sliding bracket 300 may be connected to the seat back 10 or to the seat cushion 20, and the other end of the sliding bracket 300 may be coupled to a movable rail 310 configured to slide along a fixed rail 320.

Particularly, the front end of the tilting link 100 may be connected to the bottom surface in front of the seat, and the rear end thereof may be connected to the middle part of the seat cushion 20. The front end of the sliding bracket 300 may be connected to the lower end of the seat back 10, and the lower end thereof may slide forwards/backwards behind the tilting link 100.

For example, a front mounting bracket 30 and a rear mounting bracket 40 are installed on the left and right, respectively, above a floor panel of the vehicle body on which the seat is installed.

The front end of the tilting link 100 is hinge-coupled to the front mounting bracket such that the tilting link 100 rotates around a first hinge point H1 at the front end of the tilting link 100.

The tilting link 100 has the shape of a plate elongated in the longitudinal direction, and is installed on each of the left and right sides of the seat cushion 20. In addition, front ends of the left and right tilting links 100 are coupled by a hinge shaft 120 such that, if one of the tilting links 100 rotates, the other tilting link 100 rotates accordingly. That is, both tilting links 100 rotate simultaneously.

The rear end of the tilting link 100 is hinge-coupled to the middle part of a seat cushion frame embedded in the seat cushion 20 such that the tilting link 100 and the seat cushion 20 rotate relative to each other around a second hinge point H2 at the rear end of the tilting link 100.

A fixed rail 320 is coupled between the front mounting bracket 30 and the rear mounting bracket 40 and is fixed to the vehicle body. A movable rail 310 is fitted onto the fixed rail 320 so as to slide forwards/backwards along the fixed rail 320.

The lower end of the sliding bracket 300 is fixed to the movable rail 310, and the upper end of the sliding bracket 300 is hinge-coupled to the lower end of the seat back 10 or to the rear end of the seat cushion 20 such that the seat back 10 rotates with regard to the sliding bracket 300 around a third hinge point H3 at which the hinge coupling is made.

That is, if the tilting link 100 rotates with reference to the first hinge point H1, the seat rotates with regard to the tilting link 100 with reference to the second hinge point H2 and the third hinge point H3. At the same time, the movable rail 310 coupled to the sliding bracket 300 moves along the fixed rail 320, thereby moving the seat forwards/backwards. The third hinge point H3 then defines an axis of rotation such that the seat back 10 reclines with regard to the seat cushion 20.

Referring back to FIG. 1, the present disclosure further includes a driving unit 200 configured to provide the tilting link 100 with driving torque.

For example, the driving unit 200 may be a motor capable of rotating in the forward or inverse direction. A controller 500 may be connected to the motor 200. A manipulation switch 510 may be connected to the controller 500.

If the manipulation switch 510 is manipulated such that the controller 500 applies an operation signal to the motor 200, the motor 200 receives the operation signal and operates in the forward or inverse direction. The tilting link 100 may then be rotated by driving torque from the motor 200.

Figure 3:
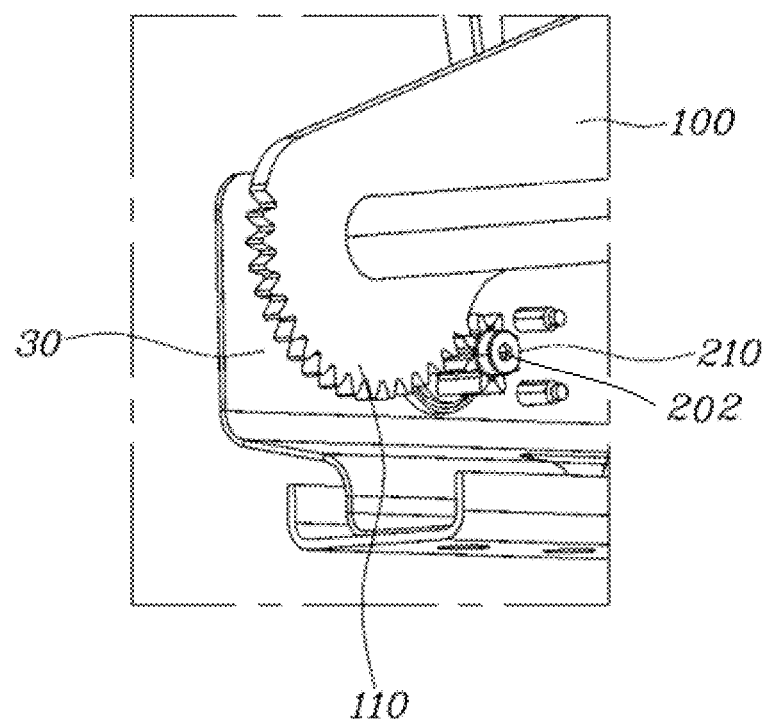
FIG. 3 illustrates the configuration of a first embodiment for transferring torque from a motor to a tilting link according to the present disclosure.

FIG. 3 illustrates the configuration of a first embodiment for transferring torque from the motor 200 to the tilting link 100 according to the present disclosure.

Referring to FIG. 3, the rotating shaft 202 of the driving unit 200 and the tilting link 100 may be connected by a power transfer element.

The power transfer element includes a pinion gear 210 and a sector gear 110 which are coupled by a gear meshing structure.

For example, the pinion gear 210 may be coupled to the rotating shaft 202 of the driving unit 200, the sector gear 110 may be formed on the edge of the other end of the tilting link 100 around the hinge structure thereof, and the sector gear 110 and the pinion gear 210 may mesh with each other.

Particularly, the sector gear 110 is formed on a part of the front-end edge of the tilting link 100. The motor 200 is coupled to the front mounting bracket 30, and the pinion gear 210 coupled to the rotating shaft 202 of the motor 200 meshes with the sector gear 110.

Accordingly, if the pinion gear 210 rotates during operation of the motor 200, the sector gear 110 meshing with the pinion gear 210 rotates, thereby rotating the tilting link 100.

Figure 4:
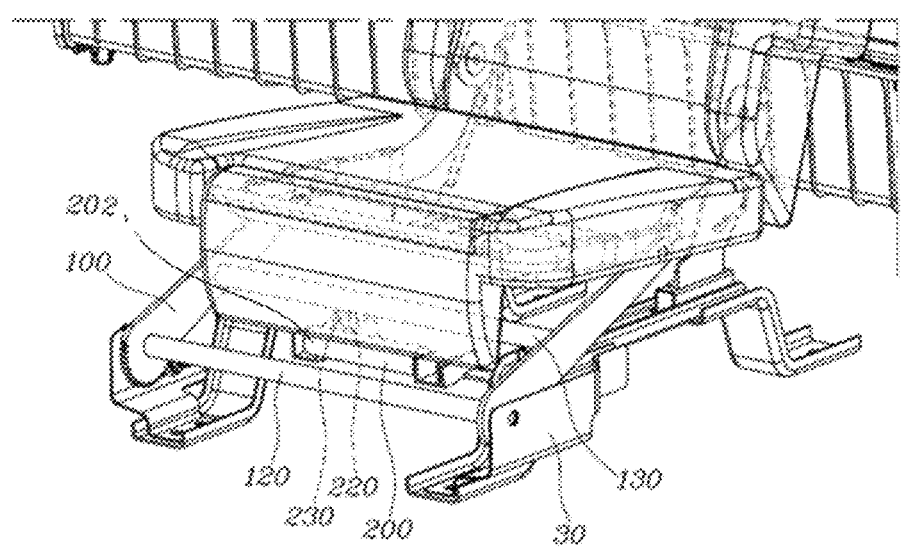
FIG. 4 illustrates the configuration of a second embodiment for transferring torque from a motor to a tilting link according to the present disclosure.

FIG. 4 illustrates the configuration of a second embodiment for transferring torque from the motor 200 to the tilting link 100 according to the present disclosure.

For example, a lead screw 230 may be connected to the rotating shaft of the driving unit 200 such that rotational movements of the driving unit 200 are converted into linear movements of the lead screw 230. A tilt operating bar 130 may be coupled to the remaining part of the tilting link 100 other than one end of the tilting link 100 and the other end thereof. The lead screw 230 may be coupled to the tilt operating bar 130.

Particularly, a motor 200 is coupled between front mounting brackets 30 on both sides and the rotating shaft inside the motor 200 is coupled to a nut member 220 by a gear meshing structure.

The gear meshing structure may include a worm gear formed on the outer peripheral surface of the rotating shaft of the motor and a worm wheel formed on the outer peripheral surface of the nut member 220. Torque is transferred from the motor 200 to the nut member 220 through the worm gear and the worm wheel such that the nut member 220 rotates inside the motor 200.

A lead screw 230 is inserted into the nut member 220 by a screw structure such that, as the nut member 220 rotates, the lead screw 230 linearly moves in the axial direction.

A tilt operating bar 130 is coupled to the middle part of the tilting link 100 between one end and the other end thereof in parallel to the hinge shaft 120, and an end of the lead screw 230 is fixedly coupled to the tilt operating bar 130.

If the nut member 220 is rotated by torque from the motor 200, rotational movements of the nut member 220 are converted into linear movements of the lead screw 230, which then moves in the axial direction. The lead screw 230 then pushes or pulls the tilt operating bar 130 such that the tilting link 100 rotates around the hinge shaft 120.

Figure 5:
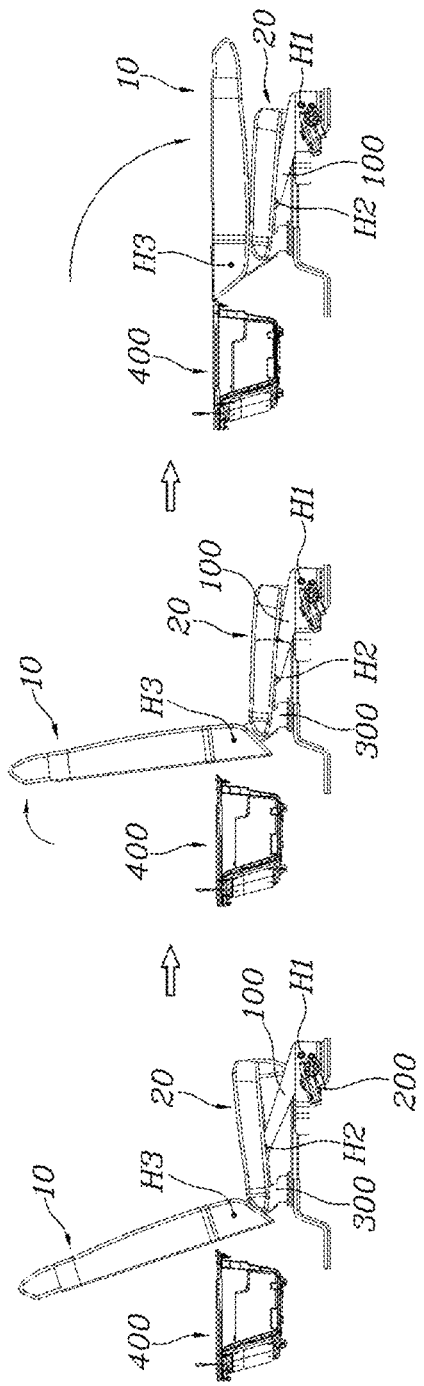
FIG. 5 illustrates a folding mode operation of a seat according to the present disclosure.

FIG. 5 illustrates a folding mode operation of a seat according to the present disclosure.

Referring to FIG. 5, in a folding mode of a seat in a structure in which a luggage box 400 is disposed behind the seat, the tilting link 100 coupled to the seat cushion 20 is rotated downwards, and the front end of the seat cushion 20 is thus tilted downwards. The sliding bracket 300 then slides forwards, thereby increasing the interval between the seat back 10 and the luggage box 400. Accordingly, the seat back 10 is folded without interfering with the luggage box 400 by means of the increased interval.

More particularly, if the manipulation switch 510 is manipulated to implement a seat folding mode, the motor 200 is driven in the forward direction such that driving power is transferred from the motor 200 to the tilting link 100 through the pinion gear 210 and the sector gear 110. The rear end of the tilting link 100 thus rotates downwards around the first hinge point H1 at the front end of the tilting link 100.

The front end of the seat cushion 20 then rotates downwards with reference to the second hinge point H2 at the rear end of the tilting link 100 and the third hinge point H3 at the lower end of the seat back 10.

At the same time, the sliding bracket 300 moves forwards by a small degree along the fixed rail 320. The seat itself then moves forwards, thereby increasing the interval between the rear surface of the seat back 10 and the luggage box 400.

If the seat back 10 is then folded forwards, no interference occurs between the seat back 10 and the luggage box 400, thereby stably implementing a seat folding mode.

Figure 6:
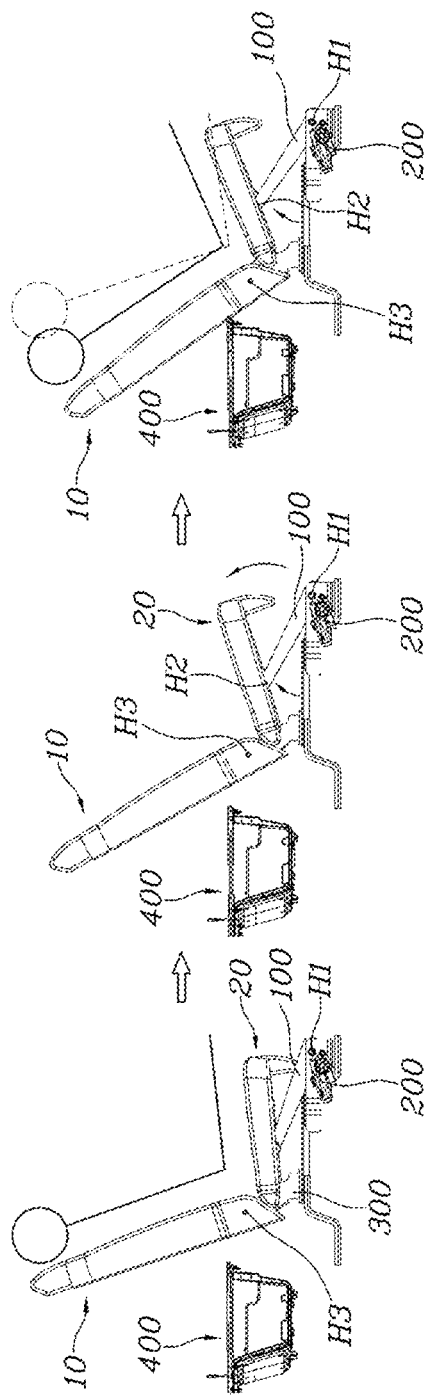
FIG. 6 illustrates a relax mode operation of a seat according to the present disclosure.

FIG. 6 illustrates a relax mode operation of a seat according to the present disclosure.

Referring to FIG. 6, in a relax mode of a seat in a structure in which a luggage box 400 is disposed behind the seat, the tilting link 100 coupled to the seat cushion 20 is rotated upwards, and the front end of the seat cushion 20 is thus tilted upwards. The sliding bracket 300 then slides forwards, thereby increasing the interval between the seat back 10 and the luggage box 400. Accordingly, the seat back 10 is reclined backwards as much as the increased interval.

More particularly, if the manipulation switch 510 is manipulated to implement a seat relax mode, the motor 200 is driven in the inverse direction such that driving power is transferred from the motor 200 to the tilting link 100 through the pinion gear 210 and the sector gear 110. The rear end of the tilting link 100 thus rotates upwards around the first hinge point H1 at the front end of the tilting link 100.

The front end of the seat cushion 20 then rotates upwards with reference to the second hinge point H2 at the rear end of the tilting link 100 and the third hinge point H3 at the lower end of the seat back 10.

At the same time, the sliding bracket 300 moves forwards by a small degree along the fixed rail 320. The seat itself then moves forwards, thereby increasing the interval between the rear surface of the seat back 10 and the luggage box 400.

If the seat back 10 is then reclined backwards, the increased interval between the seat back 10 and the luggage box 400 increases the amount of backward movement of the reclining seat back 10, thereby implementing a seat relax mode.

Figure 7:
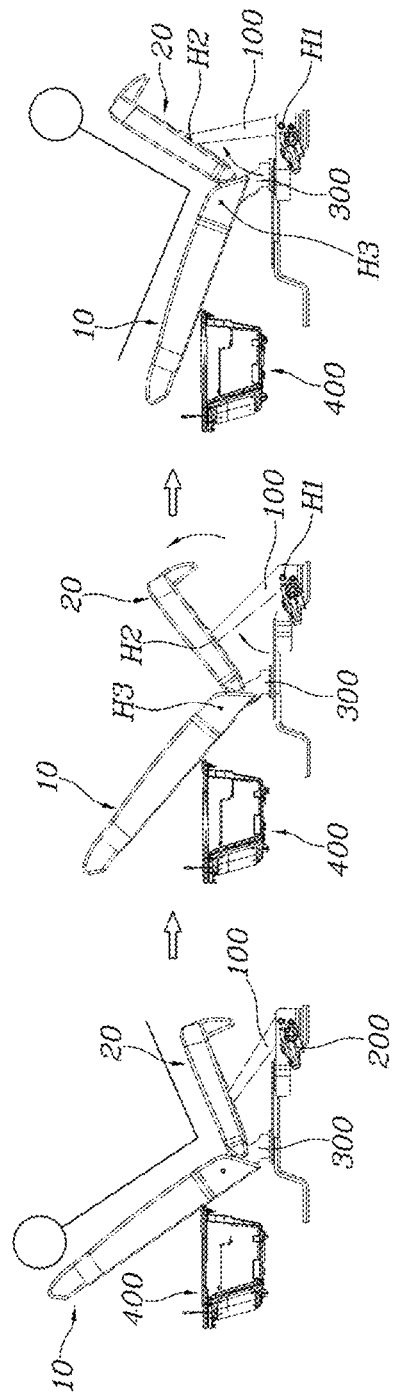
FIG. 7 illustrates a backward relax mode operation of a seat according to the present disclosure.

FIG. 7 illustrates a backward relax mode operation of a seat according to the present disclosure.

Referring to FIG. 7, in a backward relax mode of the seat, the tilting link 100 coupled to the seat cushion 20 may rotate upwards such that the front end of the seat cushion 20 is tilted upwards. The sliding bracket 300 may thus slide forwards to the maximum extent, thereby inverting the posture of the seat back 10 and that of the seat cushion 20. The seat may then be in a backward-facing posture.

More particularly, if the manipulation switch 510 is manipulated to implement a backward relax mode of the seat, the motor 200 is driven in the inverse direction such that driving power is transferred from the motor 200 to the tilting link 100 through the pinion gear 210 and the sector gear 110. The rear end of the tilting link 100 thus rotates upwards to the maximum extent around the first hinge point H1 at the front end of the tilting link 100.

The front end of the seat cushion 20 then rotates upwards with reference to the second hinge point H2 at the rear end of the tilting link 100 and the third hinge point H3 at the lower end of the seat back 10.

At the same time, the sliding bracket 300 moves forwards to the maximum extent along the fixed rail 320 and approaches the lower end of the tilting link 100. The seat back 10 is thus reclined backwards substantially, and the seat cushion 20 is simultaneously erected upwards.

Therefore, the seat cushion 20 plays the role of a backward-facing seat back 10, and the seat back 10 plays the role of the seat cushion 20, thereby implementing a backward relax mode in which a passenger can take a seat while facing backwards.

Figure 8:
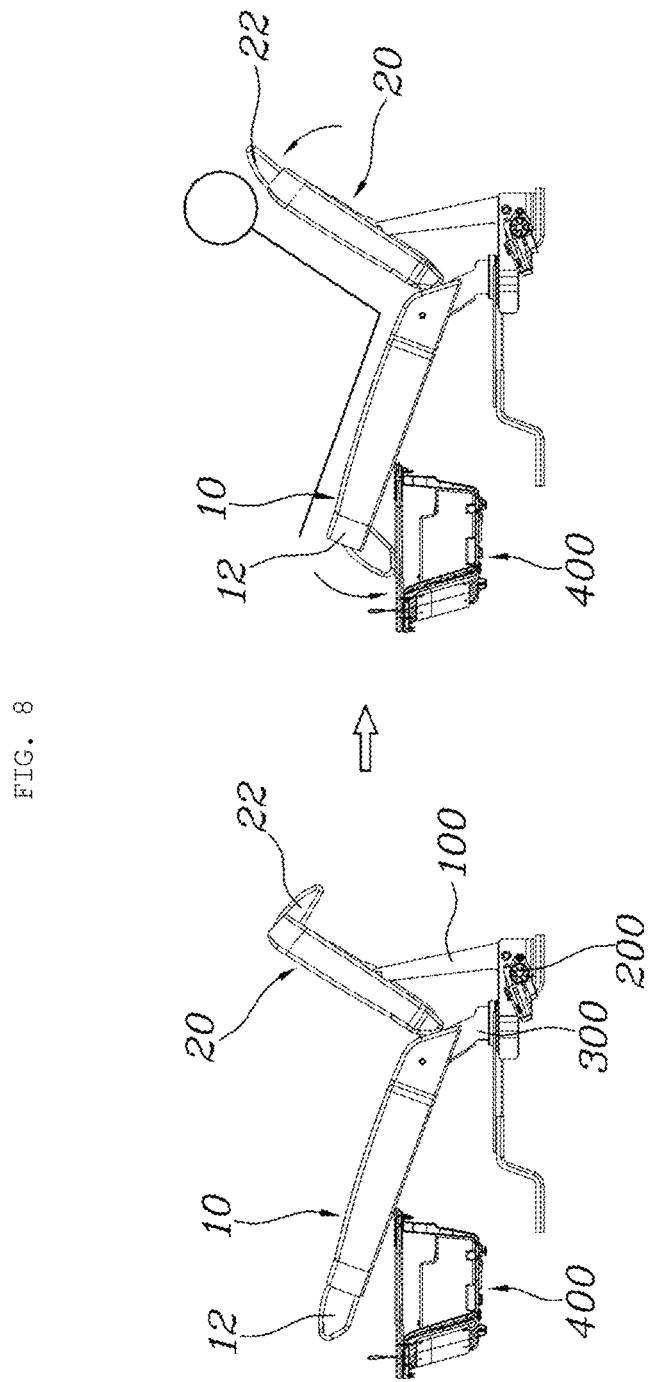
FIG. 8 illustrates states of operation of a head rest and a leg rest in a backward relax mode according to the present disclosure.

FIG. 8 illustrates states of operation of a head rest 12 and a leg rest 22 in a backward relax mode according to the present disclosure.

Referring to FIG. 8, in a backward relax mode of the seat, the head rest 12 coupled to the seat back 10 may be folded to the back of the seat 10, and the leg rest 22 coupled to the seat cushion 20 may be unfolded in parallel to the seat cushion 20.

That is, in a backward relax mode, if the leg rest 22 and the head rest 12 are folded in opposite directions, the leg rest 22 plays the role of the existing head rest 12, and the head rest 12 plays the role of the existing leg rest 22, thereby implementing a more comfortable backward relax mode posture.

As described above, according to the present disclosure, the interval between the seat and the luggage box 400 is increased by a downward movement of the front end of the seat cushion 20 in a folding mode such that the seat back 10 and the luggage box 400 are horizontally matched (or aligned) while avoiding interference between the seat back 10 and the luggage box 400, thereby implementing a seat folding mode stably.

In a relax mode, the interval between the seat and the luggage box 400 is increased by an upward movement of the front end of the seat cushion 20 such that the amount of reclining movement of the seat back 10 is increased, thereby implementing a seat relax mode stably.

In a backward relax mode, the posture of the seat cushion 20 and that of the seat back 10 are inverted by an excessive upward movement of the front end of the seat cushion 20, thereby implementing a backward relax mode in which the passenger on the seat faces backwards.

Although only particular embodiments of the present disclosure have been described above in detail, it will be apparent to those skilled in the art that various changes and modifications may be made within the scope of the technical idea of the present disclosure and, as a matter of course, these changes and modifications fall within the scope of the appended claims.

What is claimed is:

1. A vehicle seat comprising:
   a seat cushion;
   a seat back;
   a tilting link configured to tilt a front portion of a seat cushion upwards or downwards, the tilting link including a front end connected to a front mounting bracket installed above a floor panel of a vehicle body in front of the seat, and a rear end connected to a middle part of the seat cushion; and a sliding bracket having one end to which the vehicle seat is connected by a first hinge structure such that the seat is tilted around the first hinge structure, the other end of the sliding bracket being connected so as to slide forwards or backwards, the sliding bracket including an upper end connected to a lower end of the seat back, and a lower end configured to slide forwards or backwards behind the tilting link.

2. The vehicle seat of claim 1,
wherein the tilting link includes both ends connected to the seat cushion and to the vehicle body, respectively, by second and third hinge structures, respectively, one end of the sliding bracket is connected to the seat back or to the seat cushion, and the other end of the sliding bracket is coupled to a movable rail configured to slide along a fixed rail.

3. The vehicle seat of claim 2, wherein the tilting link coupled to the seat cushion is configured to, during a folding mode of the seat in a structure in which a luggage box is disposed behind the seat, rotate downwards such that a front end of the seat cushion is tilted downwards, the sliding bracket is configured to slide forwards, thereby increasing an interval between the seat back and the luggage box, and the seat back is configured to fold without interfering with the luggage box due to the increased interval in the folding mode.

4. The vehicle seat of claim 2, wherein the tilting link coupled to the seat cushion is configured to, during a relax mode of the seat in a structure in which a luggage box is disposed behind the seat, rotate upwards such that a front end of the seat cushion is tilted upwards, the sliding bracket is configured to slide forwards, thereby increasing an interval between the seat back and the luggage box, and the seat back is configured to recline backwards as much as the increased interval.

5. The vehicle seat of claim 2, wherein the tilting link coupled to the seat cushion is configured to, during a backward relax mode of the seat, rotate upwards such that a front end of the seat cushion is tilted upwards, the sliding bracket is configured to slide forwards to a maximum extent, thereby inverting postures of the seat back and the seat cushion, and the seat is configured to assume a backward-facing posture.

6. The vehicle seat of claim 5, wherein a head rest coupled to the seat back is configured to fold toward a rear portion of the seat back during the backward relax mode of the seat, and a leg rest coupled to the seat cushion is configured to unfold in parallel to the seat cushion.

7. The vehicle seat of claim 1, further comprising a driving unit configured to provide driving torque to the tilting link.

8. The vehicle seat of claim 7, wherein the driving unit includes a rotating shaft connected to the tilting link by a power transfer element.

9. The vehicle seat of claim 7, wherein the driving unit includes a pinion gear and a rotating shaft to which the pinion gear is coupled, and
the vehicle seat further comprises a sector gear disposed on an edge of the other end of the tilting link around a third hinge structure, the sector gear is coupled to the pinion gear so as to mesh with the pinion gear.

10. The vehicle seat of claim 7, further comprising:
a lead screw connected to a rotating shaft of the driving unit such that rotational movements of the driving unit are converted into linear movements of the lead screw,
a tilt operating bar coupled to a remaining part of the tilting link other than one end and the other end thereof,
wherein the lead screw is coupled to the tilt operating bar.

11. A vehicle seat comprising:
a seat cushion;
a tilting link configured to tilt a front portion of a seat cushion upwards or downwards;
a sliding bracket having one end to which the vehicle seat is connected by a first hinge structure such that the seat is tilted around the first hinge structure, the other end of the sliding bracket being connected so as to slide forwards or backwards; and
a driving unit configured to provide driving torque to the tilting link, wherein the driving unit includes a rotating shaft connected to the tilting link by a power transfer element.

* * * * *